March 16, 1926.  
E. A. KLEIN  
1,577,035  
LINE LAYING DEVICE FOR FISHING REELS  
Filed August 3, 1925
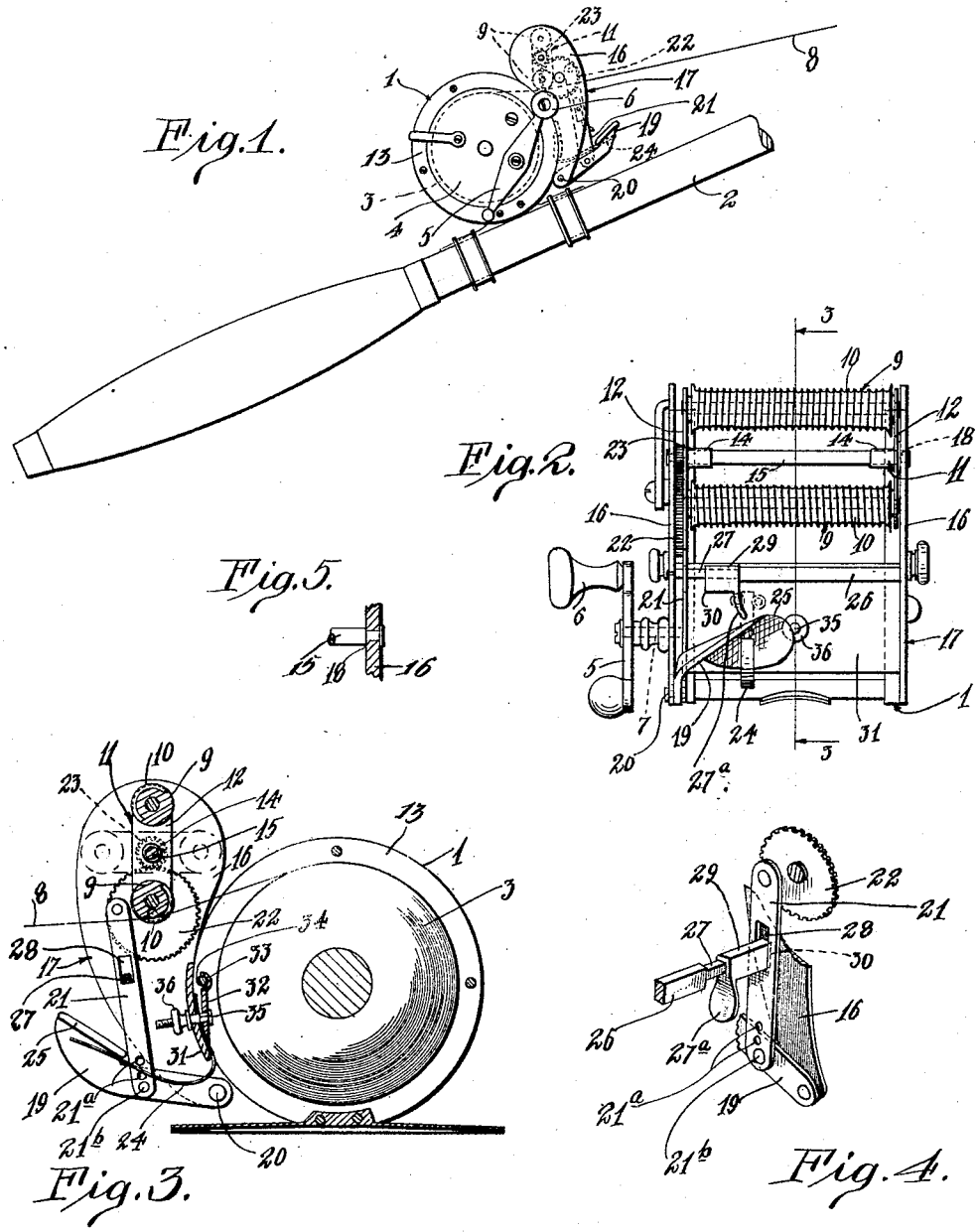
Inventor  
Emil A. Klein.  
By Lyon & Lyon  
Attorneys Patented Mar. 16, 1926.

1,577,035

UNITED STATES PATENT OFFICE.

EMIL A. KLEIN, OF LOS ANGELES, CALIFORNIA.

LINE-LAYING DEVICE FOR FISHING REELS.

Application filed August 3, 1925. Serial No. 47,657.

*To all whom it may concern:*

Be it known that I, EMIL A. KLEIN, a citizen of the United States, residing at Los Angeles, in the county of Los Angeles, State of California, have invented a new and useful Line-Laying Device for Fishing Reels, of which the following is a specification.

This invention relates to fishing reels such as used in fishing with a rod and line, and the invention is especially useful when applied to a reel in which a considerable amount of line is "taken" by the fish, for example, in deep sea fishing. When the wet line is coiled back on to the reel, and laid on the reel in irregular coils, there is a tendency for the coils to get caught together in such way as to interfere with the free running of the reel in casting, or in such way as to interfere with the proper operation of the line in "playing" a fish. In using an ordinary reel, as the line runs onto the reel, there is a tendency for it to pile on the coils at a single point, and many anglers, while operating the reel use the thumb to move the line back and forth on the reel so as to lay the line as nearly as possible in regular coils on the reel. The line running over the thumb sometimes cuts the skin.

The general object of this invention is to produce a device of simple construction having means for laying the line on the reel in regular coils passing to and fro between the heads of the reel; also to provide a device of this charcter which can be controlled at will in such a way that it will not interfere with the free running of the reel and line when casting.

Further objects of the invention will appear hereinafter.

The invention consists in the novel parts and combination of parts to be described hereinafter, all of which contribute to produce an efficient line laying device for fishing reels.

A preferred embodiment of the invention is described in the following specification while the broad scope of the invention is pointed out in the appended claims.

In the drawings:

Figure 1 is a side elevation of the handle end of a fishing rod or pole, with the body of the rod broken away, and illustrating an embodiment of my invention attached to the reel.

Figure 2 is a front elevation of the reel as viewed from the side which is disposed toward the outer end of the rod.

Figure 3 is a cross-section through my device taken on the line 3—3 of Figure 2, the reel being indicated in section in a plane adjacent one of its heads.

Figure 4 is a perspective showing in detail the means for locking the device in a neutral position, so that the line will uncoil freely from the drum, as in casting.

Figure 5 is a section taken at one end of the reel and illustrating a detail of its construction.

In the drawing 1 illustrates a reel which may be attached to a fishing rod 2 in any suitable manner. This reel may be of any suitable construction and includes a drum 3 rotatably mounted in the frame 4 of the reel.

In applying my invention, I provide a guide device associated with the drum and operating to guide the line 8 to and fro longitudinally of the drum as the coils are laid upon it. Any suitable construction may be provided for this purpose, but I prefer to provide a pair of rollers 9, and mount these rollers in such a way that they are rotatable on an axis of rotation so that either roller may be brought into engagement with the line. Each roller has a helical groove 10 formed in its face to engage the line and guide it.

These rollers are free to rotate on their own axes of rotation, and in operation are rotated by the line. In the present instance, I mount these rollers on a rotary frame 11, comprising two cross-heads 12 (see Figure 2), that are located substantially in line with the substantially circular end plates 3 of the reel frame. Each cross-head 12 has a sleeve 14 near its middle point which is rotatably mounted on a cross-bar 15, which connects end plates 16 which form the ends of the frame 17 of my line laying device (see Figure 3). This cross-bar 15 also operates as a distance piece to hold the end plates 16 rigidly in place, and for this purpose it is formed with a shoulder 18 at each end (see Figure 5) against which the adjacent end plates seat (see Figure 5). The ends are riveted against the faces of the plates 16.

I provide means for enabling either of the rollers 9 to be held in engagement with the line (see Figure 3) so that as the line runs onto the drum 3 of the reel, it will be guided along the drum and will be laid in regular coils upon the drum. For this purpose I provide hand-operated means, such as a lever 19, for rotating the rotary-frame which carries the rollers 9. In the present instance this lever is mounted so that it can be conveniently actuated by the little finger of the left hand. In order to accomplish this, the lever is pivotally mounted at 20 on the inner face of one of the end plates 16 and it is connected by a link 21 with a large gear wheel 22 rotatably mounted on the end plate and meshing with a pinion 23 rigid with the adjacent cross-head 12. A spring, for example, a leaf spring 24 is provided which presses up against the finger plate 25 of this lever (see Figure 3), that is to say, the spring exerts its force on the link in a direction to hold the rollers 9 in one of its extreme positions, that is, in the position shown in Figure 3, with one of the rollers engaging the line.

Suitable means is provided to enable the rollers 9 to be locked in a neutral position such as that in which they are illustrated in dotted lines in Figure 3. In order to accomplish this, and also to provide means for limiting movement under the action of the spring 24, I provide a cross-bar 26 which may be of flat form (see Figure 4). This cross-bar connects the end plates 16 and has a reduced or square extension 27 which passes through a slot 28 in the link. This slot and the cross-bar co-operate to limit the movement of the link under the action of the lever in both directions so that when the link is in its extreme elevated position, the rollers will be held as indicated in Figure 3.

On the extension 27 of the cross-bar 26 a stop-member 29 is mounted which consists simply of a sleeve with a head 30 at one end which may pass into the slot 28 so as to engage the lower edge of the slot and prevent the link from rising to its extreme elevated position, that is to say, the head 30 will hold the link in the mid-point of its travel and this will hold the rollers 9 in the position in which they are indicated in Figure 3 in the dotted lines.

I prefer to construct my laying device so that it can be applied to an ordinary reel as an attachment, that is to say, without necessitating reconstruction of the reel, but of course, if desired, the device may be constructed as a permanent part of the reel.

In the present instance, my improvement has been constructed as an attachment for an ordinary reel. When the device is of this type, I connect the end-plates 16 by a rigid saddle plate 31 which is concave to fit against the circumferential edges of the circular end-plates 3 of the reel. I also provide a clamping plate 32 which has a transverse socket 33 at its upper end to engage with one of the cross-bars 34 which rigidly connect the end plates 3 (see Figure 3). The lower end of this clamping plate 32 bears against the inner face of the saddle plate 31 and may be utilized to clamp the inner end of the spring 24 between the clamping plate and saddle. The clamping plate 32 is provided with a carriage bolt 35 which passes loosely through the saddle plate 31, its threaded end being provided with a nut 36; when the nut is tightened up the spring will be clamped in position and the saddle plate will also be securely held against the side of the reel.

The spring may be provided with a hole or slot for the bolt 35 to pass through.

In order to enable the position of the lever 19 to be regulated to suit different rods or the individual requirements of the angler, I provide means for attaching the lever 19 to the link in any one of a plurality of positions. In the present instance I provide several openings 21$^a$ to receive the connecting rivet 21$^b$.

The use of this device enables the line to be guided and laid in coils on the drum while holding the rod securely in the hand. This is not possible when the thumb or finger is used for guiding the line along the reel.

It also enables the line to be reeled onto the drum with great rapidity.

It is understood that the embodiment of the invention described herein is only one of the many embodiments this invention may take and I do not wish to be limited in the practice of the invention nor in the claims to the particular embodiment set forth.

What I claim is:

1. In a line laying device for a fishing reel, the combination of a drum with means for rotating the same, a movable frame supported adjacent the drum, a free running roller with a helical guide groove thereon to receive the line mounted on the frame and operating to guide the line along the drum as the coils of the line pass on to the same, said movable frame enabling the roller to be moved into or out of contact with the line.

2. In a line laying device for a fishing reel, the combination of a drum with means for rotating the same, and means supported adjacent the drum, including a pair of rollers with helical guide grooves respectively thereon to receive the line to guide the same along the drum, and means for shifting either of said rollers into engagement with the line.

3. In a line laying device for a fishing reel, the combination of a drum with means for rotating the same, a pair of guide rollers with helical grooves respectively thereon to receive the line, one of said grooves being of a righthand character and the other of a lefthand character, means for supporting the rollers to rotate on an axis between the same and means for rotating the guide rollers on said axis of rotation to bring either roller into engagement with the line.

4. In a line laying device for a fishing reel, the combination of a drum with means for rotating the same, a pair of guide rollers with helical grooves respectively thereon to receive the line, one of said grooves being of a righthand character and the other of a lefthand character, means for supporting the rollers to rotate on an axis between the same, means for rotating the guide rollers on said axis of rotation to bring either roller into engagement with the line, and means for holding the said rollers in a neutral position so that neither of them is in contact with the line when casting.

5. In a line laying device for a fishing reel, the combination of a drum with means for rotating the same, a pair of guide rollers with helical groves respectively thereon to receive the line, one of said grooves being of a righthand character and the other of a lefthand character, means for supporting the rollers to rotate on an axis between the same, means for rotating the guide rollers on said axis of rotation to bring either roller into engagement with the line, a spring exerting its force in a direction to hold one of the guide rollers in engagement with the line and hand-operated means for rotating the rollers on the said axis of rotation against the force of the spring to enable either guide roller to be operated at will.

6. In a line laying device for a fishing reel, the combination of a drum with means for rotating the same, a pair of guide rollers with helical grooves respectively thereon to receive the line, one of said grooves being of a righthand character and the other of a lefthand character, means for supporting the rollers to rotate on an axis between the same, means for rotating the guide rollers on said axis of rotation to bring either roller into engagement with the line, and means for locking the guide rollers in a neutral position with neither of them in engagement with the line, for casting.

7. In a line laying device for a fishing reel, the combination of frame, a drum with means for rotating the same, a rotary frame, a pair of rollers mounted respectively on opposite sides of the axis of rotation of the rotary frame, each of said guide rollers having a helical groove, said helical grooves being of opposite character and means for rotating the rotary frame to bring either of the rollers into engagement with the line.

8. In a line laying device for a fishing reel, the combination of frame, a drum with means for rotating the same, a rotary frame, a pair of rollers mounted respectively on opposite sides of the axis of rotation of the rotary frame, each of said guide rollers having a helical groove, said helical grooves being of opposite character and means for rotating the rotary frame, including a link with means for actuating the same, a hand-operated stop-member guided on the frame, and means carried by the link to co-operate with the stop-member to lock the rollers in a neutral position for casting.

9. In a line laying device for a fishing reel, the combination of a frame including a transverse guide-bar, a drum with means for rotating the same, a rotary frame, a pair of rollers mounted respectively on opposite sides of the axis of rotation of the rotary frame, each of said guide rollers having helical grooves, said helical grooves being of opposite character, means including a link for rotating the rotary frame to bring either of the rollers into engagement with the line, and a stop-device movably mounted on the said transverse guide-bar, said link having means to co-operate with the movable stop-member to lock the rotary frame with the rollers in a neutral position for casting.

10. In a line laying device for a fishing reel, the combination of a frame including a transverse guide-bar, a drum with means for rotating the same, a rotary frame, a pair of rollers mounted respectively on opposite sides of the axis of rotation of the rotary frame, each of said guide rollers having helical grooves, said helical grooves being of opposite character, means including a link for rotating the rotary frame to bring either of the rollers into engagement with the line, a stop-device movably mounted on the said transverse guide-bar, said link having means to co-operate with the movable stop-member to lock the rotary frame with the rollers in a neutral position for casting, and a spring associated with the rotary-frame and exerting its force in a direction to hold one of the rollers in engagement with the line.

Signed at Los Angeles, California this 22d day of July, 1925.

EMIL A. KLEIN.